United States Patent
Schedler et al.

(10) Patent No.: US 8,249,210 B2
(45) Date of Patent: Aug. 21, 2012

(54) MONOBLOC COOLING DEVICE COMPONENT

(75) Inventors: Bertram Schedler, Reutte (AT);
Dietmar Schedle, Reutte (AT);
Karlheinz Scheiber, Breitenwang (AT);
Thomas Huber, Lechaschau (AT);
Thomas Friedrich, Halblech (DE);
Anton Zabernig, Reutte (AT);
Hans-Dieter Friedle, Häselgehr (AT)

(73) Assignees: Plansee SE, Reutte (AT); The European Atomic Energy Community, Represented by the European Commission, Brussels (BE)

( * ) Notice: Subject to any disclaimer, the term of this patent is extended or adjusted under 35 U.S.C. 154(b) by 1391 days.

(21) Appl. No.: 11/796,579

(22) Filed: Apr. 27, 2007

(65) Prior Publication Data
US 2007/0246517 A1      Oct. 25, 2007

Related U.S. Application Data

(63) Continuation of application No. PCT/AT2005/000418, filed on Oct. 21, 2005.

(30) Foreign Application Priority Data

Oct. 27, 2004    (AT) ............................... GM780/2004

(51) Int. Cl.
*G21B 1/00*    (2006.01)

(52) U.S. Cl. .................... 376/100; 376/150; 376/136

(58) Field of Classification Search .................. 376/100, 376/150, 136
See application file for complete search history.

(56) References Cited

U.S. PATENT DOCUMENTS

| 5,182,075 A * | 1/1993 | Gotoh et al. .................. 376/150 |
| 5,580,670 A | 12/1996 | Grill et al. |
| 5,740,955 A | 4/1998 | Kneringer et al. |
| 7,128,980 B2 | 10/2006 | Schedler et al. |
| 2004/0195296 A1 | 10/2004 | Schedler et al. |

FOREIGN PATENT DOCUMENTS

| EP | 1 465 205 A2 | 10/2004 |
| JP | 5281378 A | 10/1993 |
| JP | 6094865 A | 4/1994 |
| JP | 06316288 A | 11/1994 |
| JP | 8301669 A | 11/1996 |
| JP | 11-1904787 | 7/1999 |
| WO | 9507869 A1 | 3/1995 |

OTHER PUBLICATIONS

Japanese Office Action dated Apr. 26, 2011. English Translation.

* cited by examiner

*Primary Examiner* — Ricardo Palabrica
(74) *Attorney, Agent, or Firm* — Laurence A. Greenberg; Werner H. Stemer; Ralph E. Locher

(57) ABSTRACT

A cooling device component of monobloc design has a heat shield made from tungsten, a tungsten alloy, a graphitic material or a carbidic material provided with a through-hole. A cooling pipe for carrying coolant is joined in the through-hole. The heat shield is in turn joined or metallurgically joined to a structural part made from a material with a tensile strength at room temperature of >300 MPa and an electrical resistivity of >0.04 Ohm $mm^2 m^{-1}$.

25 Claims, 2 Drawing Sheets

MONOBLOC COOLING DEVICE COMPONENT

CROSS-REFERENCE TO RELATED APPLICATIONS

This is a continuation, under 35 U.S.C. §120, of copending international application PCT/AT2005/000418, filed Oct. 21, 2005, which designated the United States; this application also claims the priority, under 35 U.S.C. §119, of Austrian application GM 780/2004, filed Oct. 27, 2004; the prior applications are herewith incorporated by reference in their entirety.

BACKGROUND OF THE INVENTION

Field of the Invention

The invention relates to a cooling device component having a through-hole for carrying coolant, which comprises at least one heat shield made from tungsten, a tungsten alloy, a graphitic material or a carbidic material.

First wall components for fusion reactors, such as for example diverters and limiters, which are exposed to very high loads of over 10 mW/m2, are a typical example of the use of cooling device components of this type. The region exposed to the plasma is referred to as a heat shield, while the component exposed to the plasma is referred to as the PFC (plasma facing component), and the material exposed to the plasma is referred to as the PFM (plasma facing material). PFMs must be plasma-compatible, must have a high resistance to physical and chemical sputtering, must have a high melting point/sublimation point and be as resistant as possible to thermal shocks. In addition, they must also have a high thermal conductivity, a low neutron activation and sufficient strength/fracture toughness, combined with good availability and acceptable costs. Tungsten, tungsten alloys (e.g. W-1 wt. % La2O3), graphitic materials (e.g. fiber-reinforced graphite) and carbidic materials (e.g. boron carbide) best satisfy this multi-faceted and in some cases contradictory profile of requirements. Since the energy flows act on these components for a prolonged period of time, cooling device components of this type are typically actively cooled. The dissipation of heat is assisted by heat sinks, for example made from copper or copper alloys, which are usually connected to the PFM.

Cooling device components can have various designs. In this context, a distinction is drawn between plane tile, saddle and monobloc design.

If a PFM tile with a planar connection surface is joined to the heat sink through which the coolant flows, this is referred to as a plane tile design. In the saddle design, a PFM body with a semicircular recess is joined to a tubular heat sink. The heat sink in this case has the function of producing the thermal contact between the heat-introduction side and the cooling medium and is exposed to cyclic, thermally induced loads resulting from the temperature gradient and the different expansion coefficients of the joining partners.

In the monobloc design, a pipe carrying cooling water is surrounded by the PFM heat shield which has a closed through-hole. Whereas in the saddle and plane tile design, individual heat shield components can become detached from the heat sink on account of the cyclic, thermo-mechanical loading in use, the monobloc design precludes the loss of heat shield components for geometric reasons. However, the drawback of the monobloc design is that the PFM has to cope not just with thermally induced loads but also with additional mechanical loads. Additional mechanical loads of this nature can be produced by electromagnetically induced currents which flow in the components and interact with the surrounding magnetic field. This can give rise to high-frequency acceleration forces which have to be transmitted by the structures involved. In the plane tile and saddle design, these forces are transmitted via structural materials, but in the monobloc design they are transmitted by the PFM. However, tungsten, tungsten alloys, graphitic and carbidic materials have a low fracture toughness. An additional factor in the case of fiber-reinforced graphites is the relatively low strength. In addition, neutron embrittlement occurs in use, resulting in a further increase in the susceptibility of these materials to incipient cracking. Despite many years of expensive development work in the field of first wall components, the parts which are currently available do not optimally satisfy this profile of demands. This is one reason why large-scale industrial implementation of fusion technology remains far from imminent.

SUMMARY OF THE INVENTION

Therefore, it is an object of the invention to provide a cooling device component of monobloc design (PFM heat shield with a through-hole) which suitably meets the demands resulting from both physical and mechanical stresses.

This object is achieved by a cooling device component which comprises at least one heat shield made from tungsten, a tungsten alloy, a graphitic material or a carbidic material and is provided with a through-hole, and which component also comprises at least one structural part made from a material with a tensile strength at room temperature of >300 MPa and an electrical resistivity of >0.04 Ohm $mm^2m^{-1}$ as well at least one cooling pipe for carrying coolant. In accordance with the invention, the heat shield and the structural part are joined to one another by metallurgical joining or material bonding.

The cooling device component according to the invention ideally satisfies the multi-faceted and in some cases contradictory profile of requirements presented in the description and therefore represents a simple solution to a long-standing problem. It has been found that if the strength of the structural part is >300 MPa and the electrical resistivity is >0.04 Ohm $mm^2m^{-1}$, it is possible to avoid both incipient cracking in the brittle PFM and loss of the heat shield.

The heat shield preferably has a closed through-hole, for example in the form of a continuous bore. Preferred materials for the heat shield are CFC (carbon fiber reinforced graphite), pure tungsten and W-1 wt. % $La_2O_3$. Furthermore, it is expedient if for a projected length l and a projected width b of the heat shield the projected joining area between heat shield and structural part is >0.3·(l·b). The terms projected length, projected width and projected area in this context are to be understood as meaning perpendicular projection onto a planar surface. In the case of a line/area which is planar or rectilinear in form, the actual length, width and area correspond to the projected length, width and area. In the case of a curved line/area, the projected line/area is correspondingly reduced. To ensure component reliability for a prolonged period of time under stress for components which are subject to extremely high levels of loading, a projected joining area of >0.8 (l·b) is advantageous.

Furthermore, it has proven expedient for the relative magnetic permeability of the structural part to be <1.2. Particularly suitable materials for the structural part in this context are Fe-, Ti- and Ni-based materials, which have the physical properties listed above. In this context, particular mention should be made of austenitic, ferritic, ferritic-martensitic steels and ODS (oxide dispersion strengthened) materials.

To reduce the stresses in the material composite, it is advantageous for an interlayer, preferably with a thickness of 0.01 to 5 mm and made from a ductile material with a hardness of <300 HV, to be introduced between heat shield and structural part, in which case the interlayer particularly advantageously has a stress-relief notch. It has proven expedient for the interlayer to consist of copper or a copper alloy. Structuring of the joining area, preferably on the heat shield side, for example by means of a laser, also reduces the risk of cracking.

Further expedient embodiments include a narrowing cross section of the structural part at increasing distance from the joining area, a planar design of the joining area and the introduction of a bevel or a rounded section in the edge region of the joining area/structural part.

The joining between the heat shield and the structural part can be effected for example by soldering, by simultaneously and jointly backing both joining partners by casting or by backing the heat shield by casting with a thick, ductile layer, for example of copper or aluminum, followed by a subsequent joining process by soldering, electron beam welding or for example diffusion welding. Depending on the particular embodiment, the joining of the cooling pipe to the heat shield may take place before or after the process of joining to the structural part.

This results in the following production variants, although the possible options are not restricted to the examples indicated.

Variant 1

Back casting of the through-hole and a side face of the heat shield with a ductile material. Depending on the ductile material selected, this operation may take place in one process step or in two separate process steps. This is followed by the joining of the pipe to the component described above. The side face of the heat shield which has been provided with the ductile material is joined to the structural part, for example by means of soldering, EB welding or HIP (hot isostatic pressing).

Variant 2

The through-hole and the surface of the heat shield on the side of the structural part are back cast with a ductile material. Depending on the ductile material selected, this can take place in one process step or in two separate process steps. This is followed by joining the component produced in this way to the structural part via the ductile layer (for example by means of soldering, EB welding or HIP). It is also possible for step 1 and step 2 to be combined in one process step. In this case, the structural part must have a higher melting point than the ductile material. Thereafter, the cooling pipe is joined to the component described above.

The structural part in turn is mechanically connected or joined to a support element, for example made from steel. Joining can be effected for example by means of welding, while the mechanical connection can be effected by means of a rigid bolt connection by way of one or more fins. In the event of major differences in thermal expansion occurring in use, a sliding mechanical connection, which allows relative movement between structural part and support element, may also be advantageous.

Other features which are considered as characteristic for the invention are set forth in the appended claims.

Although the invention is illustrated and described herein as embodied in monobloc cooling device component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
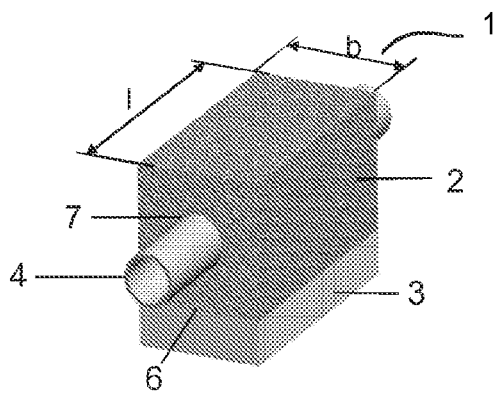
FIG. 1 shows a perspective view of a cooling device component according to the invention.

Referring now to the figures of the drawing in detail and first, particularly, to FIG. 1 thereof, the cooling device component comprises a heat shield 2, which is joined to a cooling pipe 4 via a ductile interlayer 7. The heat shield having the length l and the width b is in turn joined, at its joining area (6), to the structural part 3. The projected joining area amounts to l·b.

The heat shield 2 and the structural part 3 are joined by a metallurgical joining process such as soldering, brazing, welding (e.g., electron beam welding) or pressure welding (e.g., hot isostatic pressing), where the materials of the parts that are being joined are physically or chemically bonded to each other or a molten phase occurs during the joining operation.

Figure 2:
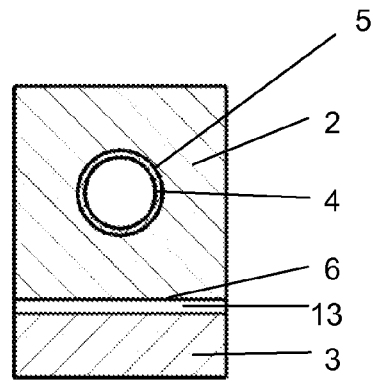
FIG. 2 to FIG. 8 show the cooling device component in cross section.
Figure 3:
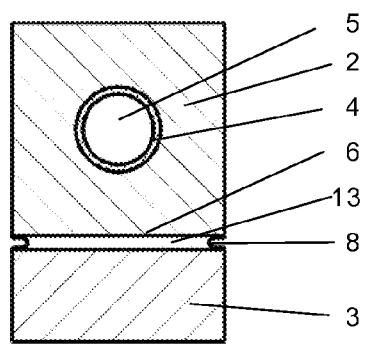
Figure 4:
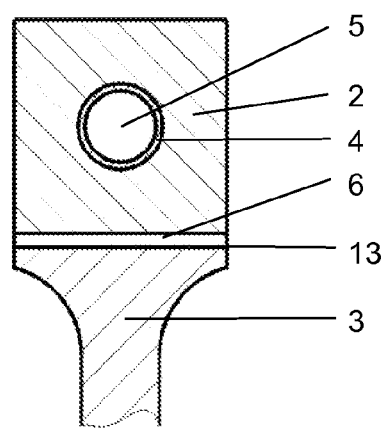
Figure 5:
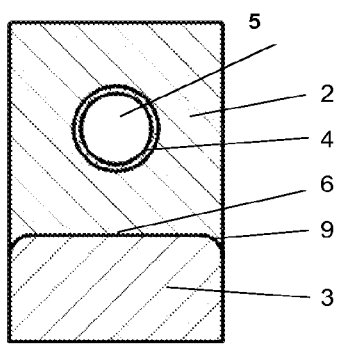
Figure 6:
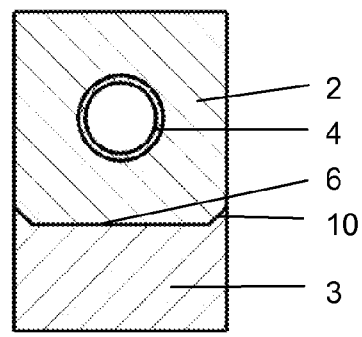
Figure 7:
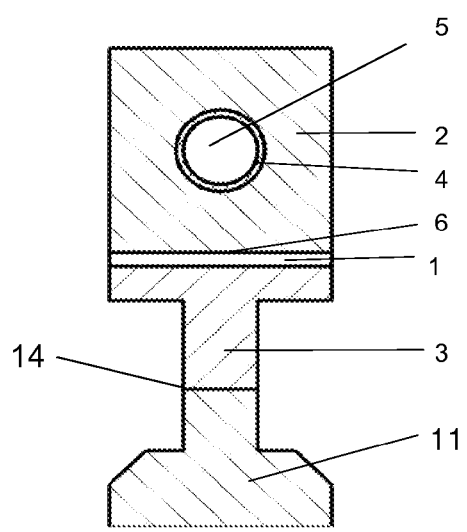
Figure 8:
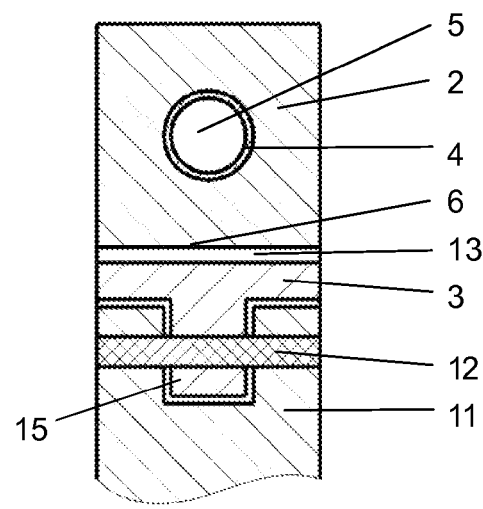

FIG. 2 shows a cooling device component 1 in which heat shield 2 is joined to the structural part 3 by way of a ductile interlayer 13. In FIG. 3, the interlayer 13 has a stress-relief notch 8. FIG. 4 shows a cooling device component 1 in which the structural part 3 has a narrowing cross section. The edge regions of the joining area 6 are provided with radii 9 in FIG. 5 and with bevels in FIG. 6. Radii and bevels may be directed upwards or downwards. FIG. 7 shows a cooling device component 1 with a joined support element 11 by way of a weld joint 14. In FIG. 8, the support element 11 is mechanically connected to the structural part 3 by means of bolt connection 12 protruding through a fin 15.

Example 1

A cooling device component of monobloc design having a heat shield made from carbon fiber reinforced graphite (CFC) was produced as follows:

Three CFC blocks with dimensions of 28 mm (ex-pitch direction) 25 mm (ex-PAN direction) and 20 mm (fiber direction) were provided with a through-hole in the form of a bore with a diameter of 14 mm. Then, the inside of the bore and one block side with dimensions of 25×20 mm were structured by laser means. In a subsequent step, OFHC copper was applied into the structured bore and/or onto the structured block surface by means of a casting process, with titanium being provided in the connecting area in order to ensure wetting. Thereafter, the OFHC copper on the block surface and in the bore was machined away to a thickness of between 0.5 and 1 mm.

Thereafter, a pipe made from a copper-chromium-zirconium alloy with a diameter of approx. 12 mm was in each case introduced into the bore. A steel cuboid provided with a 5 µm thick nickel plating on all sides and with dimensions of 25×20×30 mm was in each case positioned on the block side provided with the OFHC copper layer. The assembly produced in this way was then placed in a steel can. The steel can was welded, evacuated and subjected to a HIP process at 550° C. and 1000 bar. After removal of the can, the cooling device component was tested by means of ultrasound. The connecting areas were free of defects. Thereafter, the cooling device component produced in this way was machined and slide-mounted on a steel structure by means of a bolt connection.

Example 2

A cooling device component of monobloc design with a heat shield made from tungsten was produced as follows:

Three tungsten blocks with dimensions of 28×25×20 mm were in each case provided with a through-hole in the form of a bore with a diameter of 14 mm. The bore and a 25×20 mm side face of the tungsten block were back-cast with OFHC copper. Following the casting process, the OFHC copper both in the bore and on the block surface was machined away to a thickness of between 0.1 and 5 mm. The tungsten blocks produced in this way were then threaded onto a pipe made from a copper-chromium-zirconium alloy. A steel cuboid provided with a 5 μm thick nickel plating on all sides and with dimensions of 25×20×30 mm was in each case positioned on the block side provided with OFHC copper. Thereafter, this assembly was placed in a steel can. The steel can was welded, evacuated and subjected to a HIP process at 550° C. and 1000 bar. After removal of the can, an ultrasound test was carried out, and this did not reveal any defects. Thereafter, the cooling device component produced in this way was machined and fixed to a steel structure by means of electron beam welding.

The invention claimed is:

1. A cooling device component, comprising:
   at least one heat shield made from a material selected from the group consisting of tungsten, a tungsten alloy, a graphitic material, and a carbidic material, said at least one heat shield having a through-hole formed therein;
   at least one structural part made from a material having a tensile strength at room temperature of >300 MPa and an electrical resistivity of >0.04 Ohm $mm^2 m^{-1}$;
   said heat shield and said structural part being metallurgically joined to one another; and
   at least one cooling pipe for carrying coolant through said heat shield.

2. The cooling device component according to claim 1, wherein said heat shield and said cooling pipe are metallurgically joined to one another.

3. The cooling device component according to claim 1, wherein said heat shield has a projected length l, a projected width b, and a joining area for joining to said structural part, and the projected said joining area is >0.3·l·b.

4. The cooling device component according to claim 3, wherein the projected joining area is >0.8·l·b.

5. The cooling device component according to claim 3, wherein said joining area is a planar surface.

6. The cooling device component according to claim 3, wherein said joining area is structured in form.

7. The cooling device component according to claim 1, which comprises an interlayer of a ductile material with a hardness of <300 HV introduced between said heat shield and said structural part.

8. The cooling device component according to claim 7, wherein said interlayer consists of a copper-based material.

9. The cooling device component according to claim 7, wherein said interlayer is formed with a stress-relief notch.

10. The cooling device component according to claim 7, wherein said interlayer has a thickness from 0.01 to 5 mm.

11. The cooling device component according to claim 1, which comprises an interlayer of a ductile material with a hardness of <300 HV disposed between said heat shield and said cooling pipe.

12. The cooling device component according to claim 11, wherein said interlayer consists of copper.

13. The cooling device component according to claim 1, wherein said structural part has a cross section narrowing with an increasing distance from said joining area.

14. The cooling device component according to claim 1, wherein said structural part consists of a material selected from the group of Fe-based material, Ti-based material, and Ni-based material.

15. The cooling device component according to claim 14, wherein said structural part consists of a material selected from the group consisting of austenitic steel, ferritic steel, ferritic-martensitic steel, or an oxide dispersion-strengthened material.

16. The cooling device component according to claim 1, wherein said structural part has a relative magnetic permeability of less than 1.2.

17. The cooling device component according to claim 1, wherein at least one of said heat shield and said structural part is formed with a radius or a bevel in a region of said joining area.

18. The cooling device component according to claim 1, wherein said through-hole is formed as a continuous bore.

19. The cooling device component according to claim 1, wherein said cooling pipe consists of a copper-based material.

20. The cooling device component according to claim 1, wherein said structural part is joined to a support element by way of a weld.

21. The cooling device component according to claim 1, wherein said structural part is mechanically connected to a support element with a rigid bolt connection by way of one or more fins.

22. The cooling device component according to claim 1, wherein said structural part is connected to a support element by way of a sliding mechanical connection allowing a relative movement between said structural part and said support element.

23. The cooling device component according to claim 22, wherein said sliding mechanical connection is a bolt connection.

24. The cooling device component according to claim 1 configured as a first wall component in a fusion reactor.

25. The cooling device component according to claim 24 configured as a diverter.

* * * * *